United States Patent
Bastide et al.

(10) Patent No.: US 10,230,680 B2
(45) Date of Patent: *Mar. 12, 2019

(54) INTELLIGENTLY SPLITTING TEXT IN MESSAGES POSTED ON SOCIAL MEDIA WEBSITE TO BE MORE READABLE AND UNDERSTANDABLE FOR USER

(71) Applicant: International Business Machines Corporation, Armonk, NY (US)

(72) Inventors: Paul R. Bastide, Boxford, MA (US); Fang Lu, Shanghai (CN); Alaa Abou Mahmoud, Dracut, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,627

(22) Filed: Oct. 24, 2017

(65) Prior Publication Data
US 2018/0063068 A1 Mar. 1, 2018

Related U.S. Application Data

(63) Continuation of application No. 14/610,802, filed on Jan. 30, 2015, now Pat. No. 9,882,860, which is a
(Continued)

(51) Int. Cl.
*G06F 13/00* (2006.01)
*H04L 12/58* (2006.01)
*H04W 4/14* (2009.01)

(52) U.S. Cl.
CPC .............. *H04L 51/32* (2013.01); *H04L 51/16* (2013.01); *H04W 4/14* (2013.01)

(58) Field of Classification Search
CPC . G06Q 10/107; H04L 12/581; H04L 12/5855; H04L 12/585; H04L 12/58; H04L 51/16; H04L 15/32; H04W 4/14
(Continued)

(56) References Cited

U.S. PATENT DOCUMENTS 6,712,613 B2 * 3/2004 Depta .................. G09B 21/003
                                                                    341/22
7,669,123 B2    2/2010 Zuckerberg et al.
(Continued)

FOREIGN PATENT DOCUMENTS

| CN | 102105858 A | 6/2011 |
| CN | 102204286 A | 9/2011 |
| CN | 102388396 A | 3/2012 |

OTHER PUBLICATIONS

List of IBM Patents or Patent Applications Treated as Related, Oct. 24, 2017, pp. 1-2.
(Continued)

*Primary Examiner* — Robert B Harrell
(74) *Attorney, Agent, or Firm* — Robert A. Voigt, Jr.; Winstead, P.C.

(57) ABSTRACT

A method, system and computer program product for improving readability and understandability in messages posted on a social media website. The messages posted on a social media website, such as the user's social networking feed, are scanned. The scanned messages are analyzed for topics, meaning and/or tenses using natural language processing. The text in the scanned messages are split into message segments based on topic, meaning, tenses, punctuation, custom identifiers, hashtags and/or @ symbols. These message segments are then grouped based on relatedness of the topics, meaning and/or tenses. The message segments are ordered in each group of message segments, such as based on timestamps. The ordered message segments are then displayed to the user. By displaying these message segments in separate groupings in a logical order, the user will be able to view the messages posted on the user's social media website in a more readable and understandable manner.

15 Claims, 3 Drawing Sheets

Related U.S. Application Data continuation of application No. 14/333,706, filed on Jul. 17, 2014, now Pat. No. 9,887,952.

(58) Field of Classification Search
USPC .......................................................... 709/206
See application file for complete search history.

(56) References Cited

U.S. PATENT DOCUMENTS

| | | |
|---|---|---|
| 7,693,906 B1 | 4/2010 | Amidon et al. |
| 7,743,340 B2 | 6/2010 | Horvitz et al. |
| 7,962,555 B2 | 6/2011 | Sastry et al. |
| 8,332,477 B1 | 12/2012 | Kaiserlian et al. |
| 8,560,554 B2 | 10/2013 | Gradin et al. |
| 2004/0098754 A1 | 5/2004 | Vella et al. |
| 2008/0028027 A1 | 1/2008 | Jachner |
| 2010/0017483 A1 | 1/2010 | Estrada |
| 2010/0100904 A1 | 4/2010 | Kawakami et al. |
| 2010/0153855 A1 | 6/2010 | Roberts et al. |
| 2010/0268830 A1 | 10/2010 | McKee et al. |
| 2011/0058101 A1 | 3/2011 | Earley et al. |
| 2011/0225170 A1 | 9/2011 | Obasanjo et al. |
| 2011/0282952 A1 | 11/2011 | Song |
| 2012/0005221 A1 | 1/2012 | Ickman et al. |
| 2012/0078917 A1 | 3/2012 | Gradin et al. |
| 2012/0089681 A1 | 4/2012 | Chowdhury et al. |
| 2012/0136866 A1 | 5/2012 | Carter et al. |
| 2012/0143948 A1 | 6/2012 | Archambault et al. |
| 2012/0151320 A1 | 6/2012 | McClements, IV |
| 2012/0158843 A1 | 6/2012 | Angani et al. |
| 2012/0158863 A1 | 6/2012 | Kikin-Gil et al. |
| 2012/0272160 A1 | 10/2012 | Spivack et al. |
| 2012/0284343 A1 | 11/2012 | Lee et al. |
| 2012/0311033 A1 | 12/2012 | Tseng |
| 2012/0317091 A1 | 12/2012 | Li |
| 2013/0006973 A1 | 1/2013 | Caldwell et al. |
| 2013/0024780 A1 | 1/2013 | Sutedja et al. |
| 2013/0031034 A1 | 1/2013 | Gubin et al. |
| 2013/0061156 A1 | 3/2013 | Olsen et al. |
| 2013/0103667 A1 | 4/2013 | Minh |
| 2013/0103773 A1 | 4/2013 | Tsukidate |
| 2013/0124653 A1 | 5/2013 | Vick et al. |
| 2013/0212059 A1 | 8/2013 | Ameri-Yahia et al. |
| 2013/0282841 A1 | 10/2013 | Bates et al. |
| 2013/0297689 A1 | 11/2013 | Bhat et al. |
| 2014/0201216 A1 | 7/2014 | Bryant et al. |
| 2015/0081713 A1 | 3/2015 | Alonso et al. |
| 2015/0281163 A1 | 10/2015 | Bastide et al. |
| 2016/0065519 A1 | 3/2016 | Waltermann et al. |
| 2016/0080485 A1 | 3/2016 | Hamedi |

OTHER PUBLICATIONS

Office Action for U.S. Appl. No. 15/803,432 dated Mar. 9, 2018, pp. 1-19.

List of IBM Patents or Patent Applications Treated as Related, Nov. 3, 2017, pp. 1-2.

Balali et al., "A Supervised Approach to Predict the Hierarchical Structure of Conversation Threads for Comments," Hindawi Publishing Corporation, The Scientific World Journal, Tehran, Iran, IP.com, 3942392, Feb. 11, 2014, pp. 1-23, see abstract and pp. 1, 2, 3 and 4.

Microsoft, "Threaded IM," IPCOM000224899D, Jan. 10, 2013, pp. 1-4, see summary and p. 2.

"Introducing Zite 2.0," http://blog.zite.com/2012/12/04/introducing-zite-2-0, Dec. 4, 2012, pp. 1-4.

"MD5," http://en.wikipedia.org/wiki/MD5, 2013, pp. 1-18.

Office Action for U.S. Appl. No. 15/792,306 dated Apr. 6, 2018, pp. 1-30.

Office Action for U.S. Appl. No. 15/792,306 dated Sep. 4, 2018, pp. 1-11.

\* cited by examiner

INTELLIGENTLY SPLITTING TEXT IN MESSAGES POSTED ON SOCIAL MEDIA WEBSITE TO BE MORE READABLE AND UNDERSTANDABLE FOR USER

TECHNICAL FIELD

The present invention relates generally to social network services, and more particularly to intelligently splitting text in messages posted on a social media website (e.g., the user's profile page) to be more readable and understandable for the user.

BACKGROUND

A social network service is an online service, platform or site that focuses on building and reflecting of social networks or social relations among people (e.g., those who share interests and/or activities). A social network service essentially consists of a representation of each user (often a profile), his/her social links, and a variety of additional services. Most social network services are web-based and provide means for users to interact over the Internet, such as by e-mail and instant messaging. Social networking sites allow users to share ideas, activities, events, and interests within their individual networks.

Social networking sites (e.g., Facebook®) present to a particular user the posts and stories by other users in a social networking feed (referred to as a "news feed"). New postings or updates from friends and pages followed by the user (including photo tags, event updates, group memberships and other activity) will be reflected in the news feed. At times, some of the posts or updates include messages with multiple topics embedded within them which can lead to confusion for the user. Further confusion can result when other users start responding to one of the topics from the original post. As a result, it becomes difficult for the readers to understand which comments match which topic from the original post. The reader has to read back and forth between the comments and the original post to match them up. Such a process is inefficient in attempting to understand the flow of the conversation regarding a topic.

SUMMARY

In one embodiment of the present invention, a method for improving readability and understandability in messages posted on a social media website comprises scanning messages posted on the social media website. The method further comprises analyzing, by a processor, the scanned messages for topics, meaning and/or tenses using natural language processing. The method additionally comprises splitting text in the scanned messages into message segments based on the topics, the meaning and/or the tenses. Furthermore, the method comprises grouping the message segments into one or more groups based on relatedness of the topics, the meaning and/or the tenses. Additionally, the method comprises displaying the one or more groups of message segments.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for improving readability and understandability in messages posted on a social media website. In one embodiment of the present invention, messages posted on a social media website, such as the user's profile page or social networking feed, are scanned. The scanned messages are analyzed for topics, meaning and/or tenses using natural language processing. The text in the scanned messages are split into message segments based on topic, meaning, tenses, punctuation, predefined custom identifiers, hashtags and/or @ symbols. These message segments are then grouped based on relatedness of the topics, meaning and/or tenses. The message segments are then ordered in each group of message segments, such as based on timestamps and/or @ symbols. The ordered message segments are then displayed to the user. By displaying these message segments in separate groupings in a logical order, the user will be able to view the messages posted on the user's social media website in a more readable and understandable manner.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
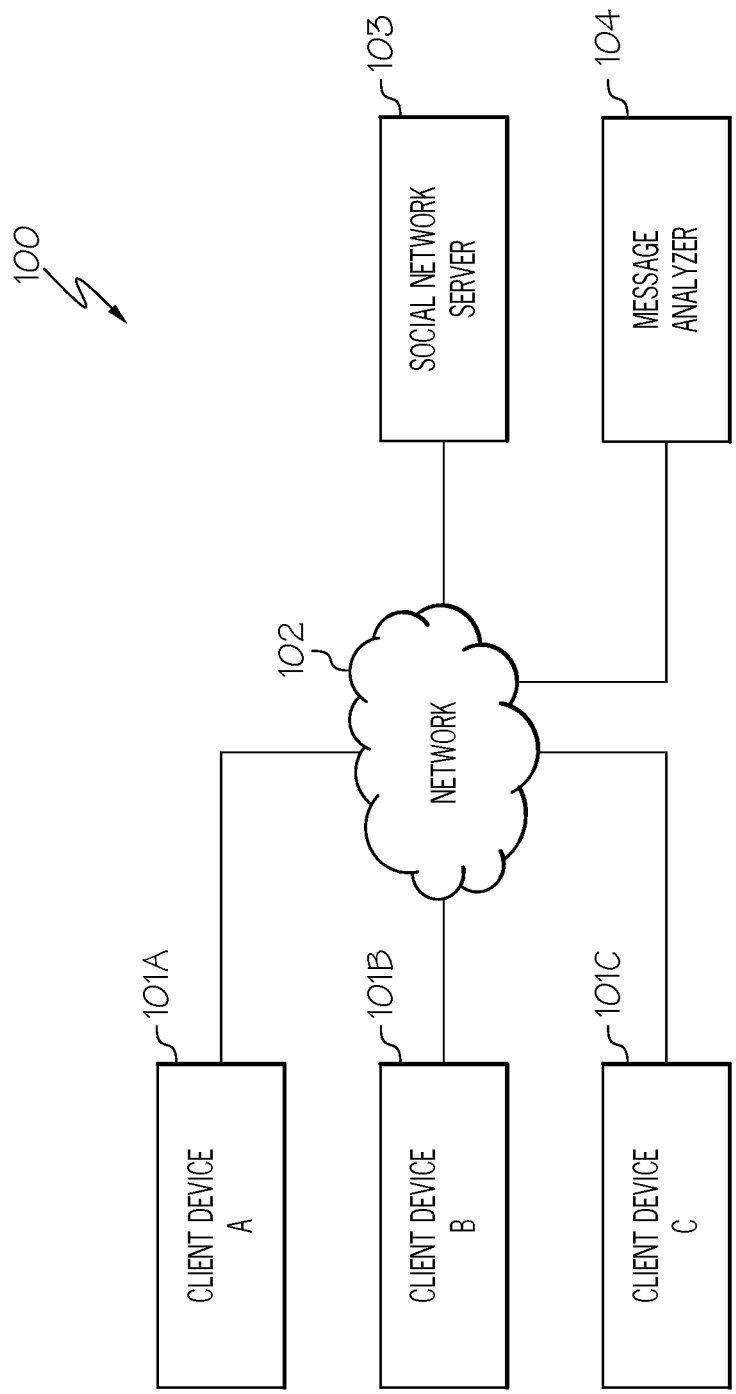
FIG. 1 illustrates a social network system configured in accordance with an embodiment of the present invention.

Referring now to the Figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 103 is connected to network 102 by wire or wirelessly. While FIG. 1 illustrates a single social network server 103, it is noted for clarity that multiple servers may be used to implement the social networking and/or microblogging service.

System 100 further includes a message analyzer 104 connected to network 102 by wire or wirelessly. Message analyzer 104 is configured to improve the readability and understandability of the message posted on a social media website (e.g., social networking feed, user's profile page) as discussed in further detail below. A description of the hardware configuration of message analyzer 104 is provided below in connection with FIG. 2.

System 100 is not to be limited in scope to any one particular network architecture. System 100 may include any number of clients 101, networks 102, social network servers 103 and message analyzers 104. Furthermore, in one embodiment, message analyzer 104 may be part of client device 101 or social network server 103.

Figure 2:
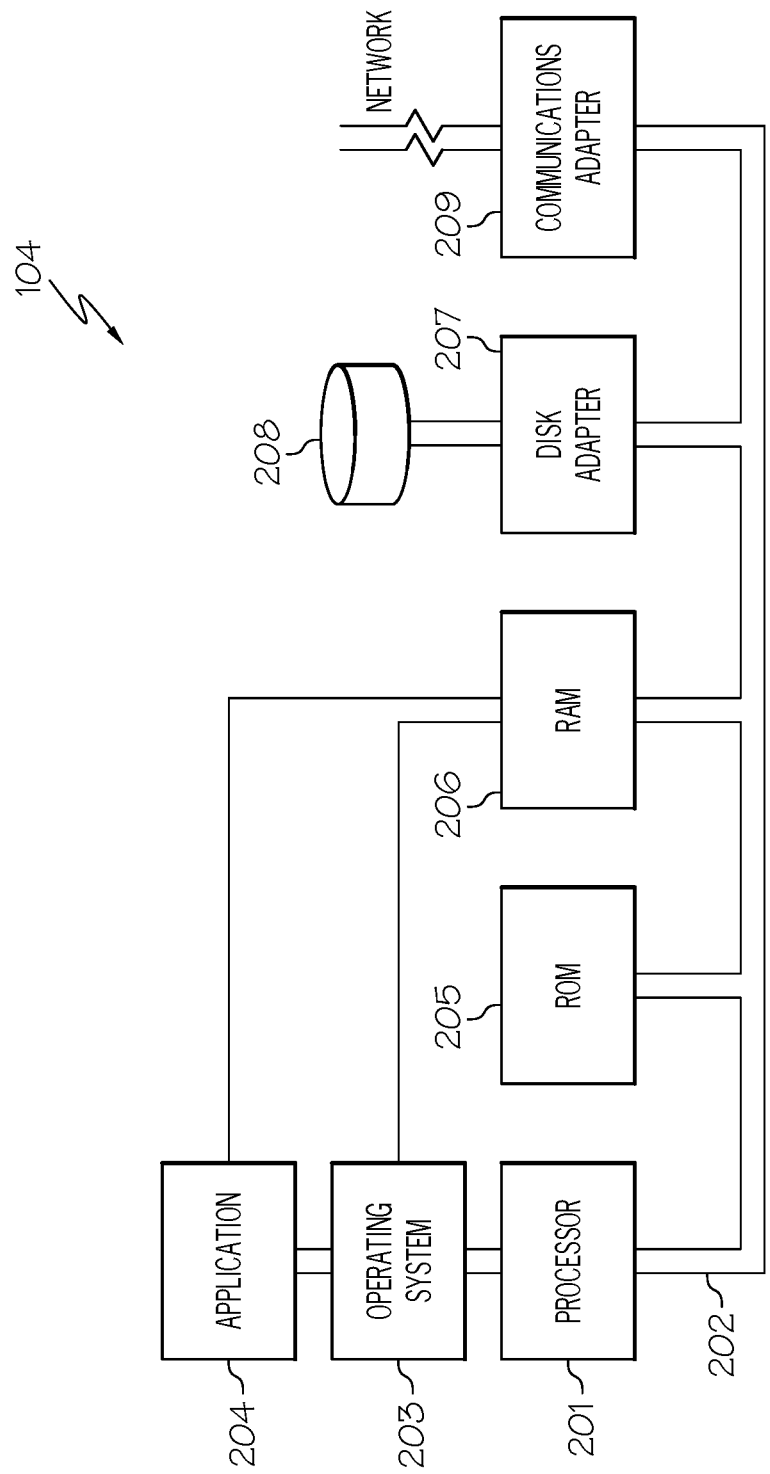
FIG. 2 illustrates a hardware configuration of a message analyzer configured in accordance with an embodiment of the present invention.

Referring now to FIG. 2, FIG. 2 illustrates a hardware configuration of a message analyzer 104 (FIG. 1) which is representative of a hardware environment for practicing the present invention. Referring to FIG. 2, message analyzer 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for improving the readability and understandability of messages posted on a social media website, as discussed further below in association with FIG. 3.

Referring again to FIG. 2, read-only memory ("ROM") 205 is coupled to system bus 202 and includes a basic input/output system ("BIOS") that controls certain basic functions of message analyzer 104. Random access memory ("RAM") 206 and disk adapter 207 are also coupled to system bus 202. It should be noted that software components including operating system 203 and application 204 may be loaded into RAM 206, which may be message analyzer's 104 main memory for execution. Disk adapter 207 may be an integrated drive electronics ("IDE") adapter that communicates with a disk unit 208, e.g., disk drive. It is noted that the program for improving the readability and understandability of messages posted on a social media website, as discussed further below in association with FIG. 3, may reside in disk unit 208 or in application 204.

Message analyzer 104 may further include a communications adapter 209 coupled to bus 202. Communications adapter 209 interconnects bus 202 with an outside network (e.g., network 102 of FIG. 1) thereby allowing message analyzer 104 to communicate with client devices 101 and social network server 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, social networking sites (e.g., Facebook®) present to a particular user the posts and stories by other users in a social networking feed (referred to as a "news feed"). New postings or updates from friends and pages followed by the user (including photo tags, event updates, group memberships and other activity) will be reflected in the news feed. At times, some of the posts or updates include messages with multiple topics embedded within them which can lead to confusion for the user. Further confusion can result when other users start responding to one of the topics from the original post. As a result, it becomes difficult for the readers to understand which comments match which topic from the original post. The reader has to read back and forth between the comments and the original post to match them up. Such a process is inefficient in attempting to understand the flow of the conversation regarding a topic.

The principles of the present invention provide a means for improving the readability and understandability of messages posted on a social media website by analyzing the messages for topics, meaning and/or tenses and splitting the analyzed messages into message segments based on topics, meaning, tenses, punctuation, predefined custom identifiers, hashtags and/or @ symbols as discussed below in association with FIG. 3.

Figure 3:
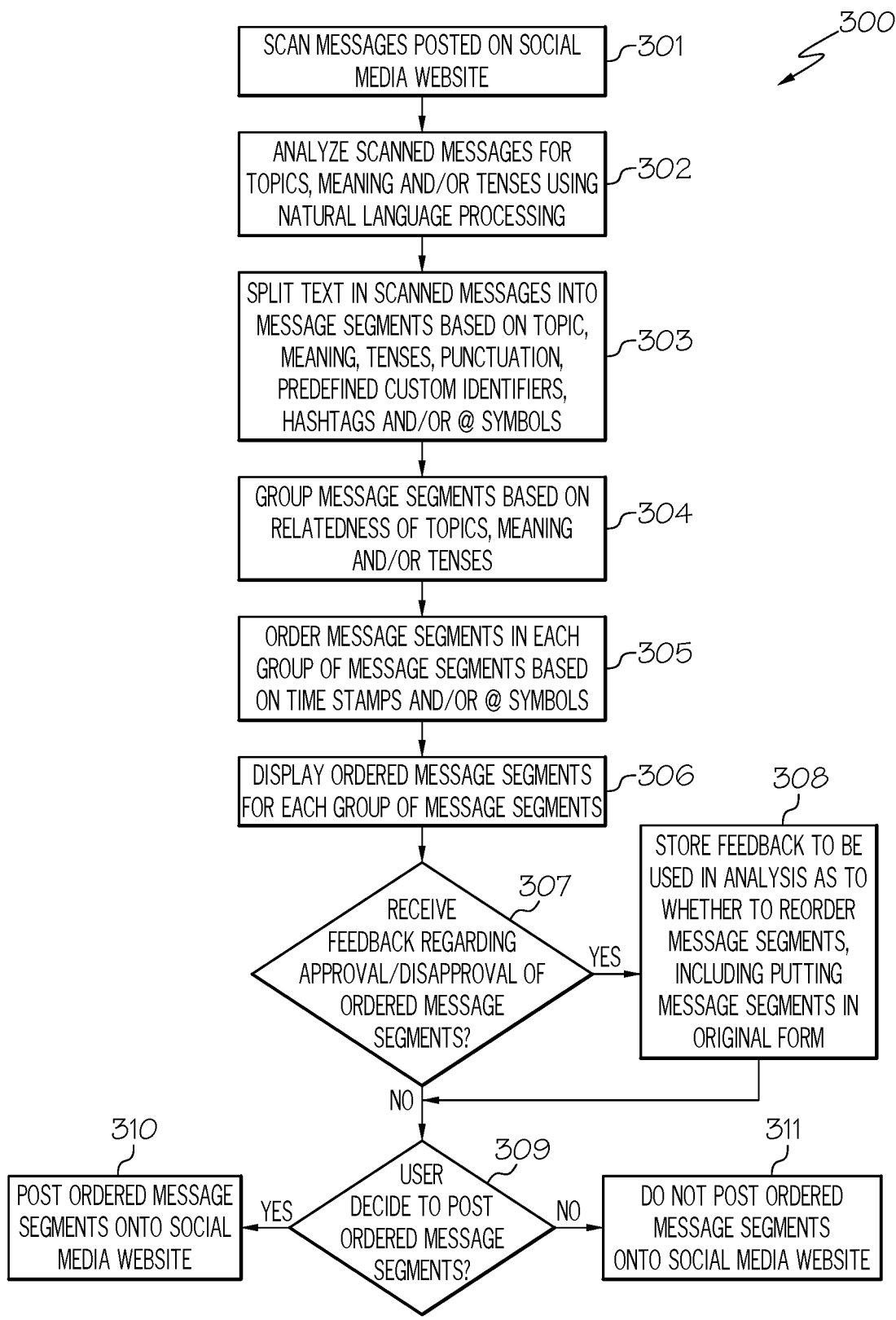
FIG. 3 is a flowchart of a method for improving the readability and understandability of messages posted on a social media website in accordance with an embodiment of the present invention.

FIG. 3 is a flowchart of a method 300 for improving the readability and understandability of messages posted on a social media website in accordance with an embodiment of the present invention.

Referring to FIG. 3, in conjunction with FIGS. 1-2, in step 301, message analyzer 104 scans the messages posted on a social media website, such as the user's profile page or social networking feed. In one embodiment, the scanning may be performed periodically. In another embodiment, the scanning may be performed based on a threshold, such a particular number of characters posted (e.g., 200 characters). In a further embodiment, the scanning may be performed based on the amount of discussion (e.g., the number of posts and/or amount of text) concerning a particular post, update, comment, topic, etc. "Scanning," as used herein, may include either scanning one message at a time or scanning multiple messages in a batch operation.

In step 302, message analyzer 104 analyzes the scanned messages for topics, meaning and/or tenses using natural language processing. As discussed above, a message posted on the social media website, such as a social networking feed, may include multiple topics. A "topic" refers to a subject of a conversation or discussion in the posted message. For example, message analyzer 104 may identify one or more topics in the posted message by focusing on keywords, such as "travel," "sports," and "cars," when analyzing the message using natural language processing.

In one embodiment, message analyzer 104 utilizes natural language processing to derive meaning from the posted messages. For instance, suppose that a user posts a message pertaining to bats used in baseball. The term "bat" may be interpreted as corresponding to a flying mammal or to a wooden instrument for hitting a baseball. Since the term "baseball" was used in connection with the term "bat," it may be deduced that the term "bat" refers to the wooden instrument used for hitting a baseball as opposed to a flying mammal. Such processing may be used to identify the appropriate meaning in the posted message.

The "tense" refers to the category of the verbal inflection (e.g., past, present or future) that specifies the time of the action or state expressed by the verb. For example, in the message "I went to work," the term "went" indicates a past action. In another example, in the message "I am going to see a movie with my friends this weekend," the phrase "am going" indicates a future action. Such analysis may be accomplished via the use of natural language processing.

In step 303, message analyzer 104 splits the text in the scanned messages into message segments based on topic, meaning, tenses, punctuation, predefined custom identifiers, hashtags and/or @ symbols. By splitting the text in the messages into message segments, the user (e.g., user of client device 101A) will be able to comprehend the messages more easily as discussed further below. For example, in the post "John Doe is leaving for Florida next week. Have you heard anything about who leads the American League all-star voting? I am going to be voting for Miguel Cabrera to participate in the all-star game," various topics may be identified, such as "travel" and "all-star voting" using natural language processing as discussed above. Message analyzer 104 may split the text in the post into the message segment of "John Doe is leaving for Florida next week" to be associated with the topic of "travel" and into the message segments of "Have you heard anything about who leads the American League all-star voting?" and "I am going to be voting for Miguel Cabrera to participate in the all-star game" to be associated with the topic of "all-star voting." These message segments will then be displayed to the user in separately groupings as discussed further below thereby enabling the user to comprehend the messages more easily.

Text in the scanned messages may also be split based on meaning. Referring to the above example, the text in the post may be split into the message segment of "John Doe is leaving for Florida next week" to be associated with the meaning of "travel" and into the message segments of "Have you heard anything about who leads the American League all-star voting?" and "I am going to be voting for Miguel Cabrera to participate in the all-star game" to be associated with the meaning of "baseball" deduced by the phrase "America League" and the baseball player of "Miguel Cabrera."

Text in the scanned messages may also be split based on tenses. In the post "I went to work. I am going to the gym after work," message analyzer 104 may split the text in the post into the message segments of "I went to work," and "I am going to the gym after work" based on the tenses of "went" (signifying a past action) and "am going" (signifying a future action).

Furthermore, text in the scanned messages may be split based on punctuation. For example, in the English language, a period sign is commonly used to indicate the end of a statement. As a result, such a punctuation sign may be used by message analyzer 104 to identify a message segment.

Additionally, text in the scanned messages may be split based on predefined custom identifiers. Predefined custom identifiers refer to identifiers, such as signs, symbols, etc. used in a message that the user indicates as to be used to separate text. For example, the user may select the semicolon sign as the string identifier to split the text.

Furthermore, text in the scanned messages may be split based on hashtags. A hashtag is a word or a phrase preceded by a hash or pound sign ("#") and used to identify messages on a specific topic.

Additionally, text in the scanned message may be split based on the use of @ symbols. Some networking websites utilize the @ symbol, such as via the use of "@<name>," where the "@<name>" refers to a particular person (e.g., "@John"). Such a designation may be used to designate a particular person thereby indicating to split the text associated with the "@<name>" from the other text in the message. For example, one or more "@<names>" may be used in a message related to one or more topics. For instance, in the post "Have you heard anything about who leads the American League all-star voting? @John @Bill Have you been to Florida? @Jane," the topic of baseball relates to the persons identified by @John and @Bill, whereas, the topic of traveling relates to the person identified by @Jane. As a result, message analyzer 104 may split the text in the post into the message segments of "Have you heard anything about who leads the American League all-star voting?" and "Have you been to Florida?"

In step 304, message analyzer 104 groups the message segments based on relatedness of topics, meaning and/or tenses. For instance, referring to the example post discussed above of "John Doe is leaving for Florida next week. Have you heard anything about who leads the American League all-star voting? I am going to be voting for Miguel Cabrera to participate in the all-star game," the message segments of "Have you heard anything about who leads the American League all-star voting?" and "I am going to be voting for Miguel Cabrera to participate in the all-star game" would be grouped together since they are both associated with the topic of "all-star voting."

In step 305, message analyzer 104 orders the message segments in each group of message segments based on timestamps and/or @ symbols. For example, in the group of message segments consisting of "Have you heard anything about who leads the American League all-star voting?" and "I am going to be voting for Miguel Cabrera to participate in the all-star game," the message segment of "Have you heard anything about who leads the American League all-star voting?" would be ordered prior to the message segment of "I am going to be voting for Miguel Cabrera to participate in the all-star game" since it was posted prior to the other message segment based on the timestamps.

In another example, some networking websites utilize the @ symbol, such as via the use of "@<number>," where the "@<number>" signifies the order of the string used to reply to the first topic. For example, the "@1" string may indicate the first string used to reply to the first topic, the "@2" string may indicate the second string used to reply to the first topic and so forth.

In step 306, message analyzer 104 displays the ordered message segments for each group of message segments to the user (e.g., user of client device 101A). In this manner, the user is able to view the messages posted on the user's social media website in a more readable and understandable way. In one embodiment, the message segments are displayed in a particular order via a user interface on client device 101. In one embodiment, the user of client device 101 may have the capability of selecting the option via the user interface of only viewing the reply messages/comments to the original post.

In step 307, a determination is made by message analyzer 104 as to whether feedback is received from the user (e.g., user of client device 101A) regarding the approval/disapproval of the order of the message segments displayed. In one embodiment, message analyzer 104 may provide the ability for the user to provide feedback regarding the displayed order of message segments via a user interface on client device 101.

If message analyzer 104 received feedback from the user regarding the approval/disapproval of the order of the message segments displayed, then, in step 308, message analyzer 104 stores the feedback to be used in the analysis as to whether to reorder the message segments, including putting the message segments in its original form.

If, however, message analyzer 104 did not receive feedback from the user regarding the approval/disapproval of the order of the message segments displayed, or upon storing the feedback received from the user in step 308, then, in step 309, message analyzer 104 determines whether the user has decided to post the ordered message segments (the ordered message segments displayed to the user) for a group(s) of message segments. In one embodiment, message analyzer 104 provides the user (e.g., user of client device 101A) the ability to post the displayed ordered message segments onto a social media website, such as a social networking feed, including another user's social networking feed. In one embodiment, the posting of the displayed ordered message segments is in connection with an update/comment with respect to the original posting. By including the ordered message segments with the user's update/comment, the user's update/comments will be more understandable. In one embodiment, message analyzer 104 provides the ability to allow the user to specify when to post the ordered message segments, such as via the user interface on client device 101 using the "@<time>" symbol. For example, the symbol of "@1 hour>" would indicate to post the ordered message segments in one hour.

If message analyzer 104 received an indication from the user to post the ordered message segments, then, in step 310, message analyzer 104 posts the ordered message segments onto a social media website, such as a social networking feed, including another user's social networking feed. In one embodiment, the ordered message segments are posted along with the user's update/comment, such as pertaining to an original posting.

If, however, message analyzer 104 did not receive an indication from the user to post the ordered message segments, then, in step 311, message analyzer 104 does not post the ordered message segments onto a social media website.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for addressing a technical problem of social networking sites presenting posts or updates that include messages with multiple topics embedded within them that leads to confusion, the method comprising:
   scanning messages posted on said social media website, wherein said social media website comprises a user's profile page or a social networking feed;
   analyzing, by a processor, said scanned messages for topics, meaning and tenses using natural language processing;
   splitting text in said scanned messages into message segments based on said topics, said meaning and said tenses;
   grouping said message segments into one or more groups based on relatedness of said topics, said meaning and said tenses;
   ordering said messages segments in each of said one or more groups of message segments based on timestamps and/or character symbols; and
   displaying said ordered message segments in each of said one or more groups of message segments for improving the technical problem of social networking sites presenting posts or updates that include messages with multiple topics embedded within them that leads to confusion.

2. The method as recited in claim 1 further comprising:
   posting said ordered message segments in a group of message segments.

3. The method as recited in claim 2 further comprising:
   providing a user an ability to specify when to post said ordered message segments in said group of message segments.

4. The method as recited in claim 3, wherein said user specifies when to post said ordered message segments in said group of message segments using a character symbol.

5. The method as recited in claim 2 further comprising:
   posting said ordered message segments in said group of message segments along with a user's update or comment.

6. The method as recited in claim 2 further comprising:
   posting said ordered message segments in said group of message segments onto another user's social media website.

7. The method as recited in claim 2, wherein said posting of said ordered message segments in said group of message segments is in connection with an update or comment to a post.

8. The method as recited in claim 1 further comprising:
   receiving feedback regarding approval or disapproval of order of said message segments in a group of message segments.

9. The method as recited in claim 8 further comprising:
   storing said feedback to be used in analysis as to whether to reorder said message segments in said group of message segments.

10. The method as recited in claim 1 further comprising:
    splitting text in said scanned messages into said message segments based on said topics, said meaning, said tenses, punctuation, predefined custom identifiers, hashtags and character symbols.

11. The method as recited in claim 10, wherein said punctuation comprises a period, wherein said predefined custom identifiers comprise a semicolon.

12. The method as recited in claim 1, wherein said character symbols comprise an @ symbol.

13. The method as recited in claim 1, wherein said scanning is performed periodically.

14. The method as recited in claim 1, wherein said scanning is performed in response to a particular number of characters posted.

15. The method as recited in claim 1, wherein said scanning is performed in response to a number of posts and/or an amount of text.

* * * * *